(12) United States Patent
Kasai et al.

(10) Patent No.: US 6,433,918 B1
(45) Date of Patent: Aug. 13, 2002

(54) OPTICAL PARAMETRIC OSCILLATOR

(75) Inventors: Katsuyuki Kasai, c/o Kansai Advanced Research Center, Communication Research Laboratory, Ministry of Posts and Telecommunications, 588-2 Iwaoka, Iwaoka-cho, Nishi-ku, Kobe-shi, Hyougo-ken (JP); Claude Fabre, Paris (FR)

(73) Assignees: Communications Research Laboratory, Independent Administrative Institution; Katsuyuki Kasai, both of Koganei (JP)

( * ) Notice: Subject to any disclaimer, the term of this patent is extended or adjusted under 35 U.S.C. 154(b) by 185 days.

(21) Appl. No.: 09/629,887

(22) Filed: Jul. 31, 2000

(30) Foreign Application Priority Data

Jul. 30, 1999 (JP) .......................................... 11-217573

(51) Int. Cl.⁷ ................................................ G02F 1/39
(52) U.S. Cl. ....................................... 359/330; 359/326
(58) Field of Search ................................ 359/326–332

(56) References Cited

U.S. PATENT DOCUMENTS 3,662,183 A * 5/1972 Ashkin et al. .......... 359/330 X
5,195,104 A * 3/1993 Geiger et al. ........... 359/330 X
5,291,503 A * 3/1994 Geiger et al. ........... 359/330 X

FOREIGN PATENT DOCUMENTS

JP      10-213829     8/1998
JP      11-119274    * 4/1999

OTHER PUBLICATIONS

D. Lee, et al., Applied Physics, vol. 66, pp. 133–143, "Tuning Characteristics of a CW Dual–Cavity KTP Optical Parametric Oscillator", 1998.

F.G. Colville, et al., Applied Physics Letters, vol. 64, No. 12, pp. 1490–1492, "Continuous–Wave, Dual–Cavity, Doubly Resonant, Optical Parametric Oscillator", Mar. 21, 1994.

* cited by examiner

Primary Examiner—John D. Lee
(74) Attorney, Agent, or Firm—Oblon, Spivak, McClelland, Maier & Neustadt, P.C.

(57) ABSTRACT

An optical parametric oscillator includes a nonlinear element for converting an incident pump beam of angular frequency $\omega_p$ into a combination of a signal wave of angular frequency $\omega_s$ and an idler wave of angular frequency $\omega_i$ at an arbitrary angular frequency ratio, a beam splitter for splitting the combination exiting the nonlinear element into the signal wave of angular frequency $\omega_s$ and the idler wave of angular frequency $\omega_i$, a signal optical resonator for resonating the signal wave of angular frequency $\omega_s$ at a resonator optical length $L_s$ between an input mirror and an end mirror, and an idler optical resonator for resonating the idler wave of angular frequency $\omega_i$ at a resonator optical length $L_i$ between an input mirror and an end mirror. The resonator optical length $L_s$ of the signal optical resonator and the resonator optical length $L_i$ of the idler optical resonator are set to satisfy the relationship $L_i/L_s=\omega_i/\omega_s$. A signal wave reflection side functioning as the end mirror of the signal optical resonator and an idler wave reflection side functioning as the end mirror of the idler optical resonator are faced in opposite directions to form a common end mirror. Continuous frequency tuning is conducted by moving the common end mirror within a range wherein a maximum variation range $\delta L(Max)$ satisfies $\delta L(Max)=2C\gamma/[\omega_s-\omega_p\times L_s/(L_s+L_i)]$ (where C is the velocity of light and $\gamma$ is an optical resonator loss parameter).

3 Claims, 10 Drawing Sheets

OPTICAL PARAMETRIC OSCILLATOR

BACKGROUND OF THE INVENTION

1. Field of the Invention

This invention relates to a doubly resonant optical parametric oscillator particularly to a doubly resonant optical parametric oscillator whose wavelength is continuously tunable.

2. Description of the Prior Art

An optical parametric oscillator capable of providing a frequency-tunable coherent beam source (laser beam source) can be used as a light source in spectrometry, photochemistry, physical property research, optical data processing, optical control and optical communications, as well as in optical computed tomography as a tool for collecting optical biometric information, and is also expected to find applications in various branches of medicine and medical environments. Use in fields of quantum optics, such as for generation of frequency-tunable non-classical beams, is also possible.

The ordinary optical parametric oscillator conventionally has a structure obtained by inserting a nonlinear material (nonlinear crystal) into an optical resonator composed of two mirrors. When excited by a coherent beam [pump (excitation) beam, angular frequency $\omega_p$], it splits the angular frequency $\omega_p$ of the coherent beam, at an arbitrary frequency ratio dependent on the phase matching condition to produce a signal wave of angular frequency $\omega_s$ and an idler wave of angular frequency $\omega_i$.

Based on optical resonator structure, optical parametric oscillators are divided into the doubly resonant optical parametric oscillator (DRO), which resonate both the signal wave and the idler wave, and the singly resonant optical parametric oscillator (SRO), which resonates one or the other of the light waves. Although the DRO has the advantage of a much lower threshold than the SRO, it has the drawback of unstable oscillating performance and, as discussed further in the following, is incapable of continuous frequency tuning. On the other hand, the SRO requires a high-output laser as a pump beam source because of its high threshold. A particular disadvantage of the SRO is therefore the difficulty of realizing optical parametric oscillation with a continuous wave (CW) beam source.

The relationship among the pump beam angular frequency $\omega_p$, the signal wave angular frequency $\omega_s$ and the idler wave angular frequency $\omega_i$ expressed by the following Equation 1 has to be established to realize optical parametric oscillation.

$$\omega_p = \omega_s + \omega_i \quad \text{Eq. 1}$$

In a DRO, therefore, an attempt to achieve frequency tuning by varying the resonator optical lengths cannot succeed because simultaneous increase or decrease of both the $\omega_s$ and $\omega_i$ resonant frequencies makes it impossible to maintain the relationship of Equation 1. A DRO therefore cannot produce an output capable of continuous frequency tuning because oscillation becomes intermittent during the frequency tuning owing to mode hopping.

In contrast, frequency tuning of an SRO can be achieved without upsetting the relationship of Equation 1 because only one or the other of the signal wave and the idler wave is resonated.

In order to achieve DRO frequency tuning it has therefore been proposed to configure separate optical resonators for the signal wave and the idler wave so that the signal wave and the idler wave can be separately resonated.

In a DRO provided with separate optical resonators for the signal wave and the idler wave, however, continuous resonant frequency tuning is difficult to conduct because the optical lengths of the optical resonators have to be controlled independently.

This invention was accomplished in light of the foregoing circumstances. An object of the invention is to provide a doubly resonant optical parametric oscillator (DRO) that enables simultaneous resonance of the signal wave and the idler wave and continuous wavelength tuning without upsetting the relationship of Equation 1.

Another object of this invention is to provide a DRO that achieves high oscillation stability using either a continuous wave beam source or a pulse beam source.

SUMMARY OF THE INVENTION

For achieving this object, this invention provides an optical parametric oscillator comprising:

a nonlinear element for converting an incident pump beam of angular frequency $\omega_p$ into a combination of a signal wave of angular frequency $\omega_s$ and an idler wave of angular frequency $\omega_i$ at an arbitrary angular frequency ratio, beam splitting means (e.g., a polarizing beam splitter) for splitting the combination exiting the nonlinear element into the signal wave of angular frequency $\omega_s$ and the idler wave of angular frequency $\omega_i$, signal optical resonance means (e.g., an input/output mirror, nonlinear crystal, polarizing beam splitter, relay mirror, and common end mirror) for resonating the signal wave of angular frequency $\omega_s$ split by the beam splitting means at a resonator optical length $L_s$ between an input mirror and an end mirror, and idler optical resonance means (e.g, an input/output mirror, nonlinear crystal, polarizing beam splitter, relay mirror and common end mirror) for resonating the idler wave of angular frequency $\omega_i$ split by the beam splitting means at a resonator optical length $L_i$ between an input mirror and an end mirror, the resonator optical length $L_s$ of the signal optical resonance means and the resonator optical length $L_i$ of the idler optical resonance means being set to satisfy the relationship $L_i/L_s = \omega_i/\omega_s$, a signal wave reflection side functioning as the end mirror of the signal optical resonance means and an idler wave reflection side functioning as the end mirror of the idler optical resonance means being faced in opposite directions to form a common end mirror, and continuous frequency tuning being conducted while maintaining signal wave and idler wave oscillations by moving the common end mirror within a range wherein a maximum variation range $\delta L(Max)$ satisfies $\delta L(Max) = 2C\gamma/[\omega_s - \omega_p \times L_s/L_s + L_i)]$ (where C is the velocity of light and $\gamma$ is an optical resonator loss parameter).

As pointed out above, continuous oscillation wavelength tuning can be achieved without upsetting the relationship of Equation 1 by causing the signal wave angular frequency $\omega_s$, idler wave angular frequency $\omega_i$, resonator optical length $L_s$, and resonator optical length $L_i$ to satisfy the relationship $L_i/L_s = \omega_i/\omega_s$ and the maximum variation range of common end mirror to satisfy $2C\gamma/[\omega_s - \omega_p \times L_s/(L_s + L_i)]$.

Since the signal optical resonance means and the idler optical resonance means are separately configured and share only the common end mirror, a parametric oscillator exhibiting a high degree of oscillation stability can be provided.

The above and other objects and features of the invention will become apparent from the following description made with reference to the drawings.

BRIEF EXPLANATION OF THE DRAWINGS

FIG. 15($b$) is a schematic diagram showing the top of the drive system shown in FIG. 15($a$).

DESCRIPTION OF THE PREFERRED EMBODIMENTS

Figure 1:
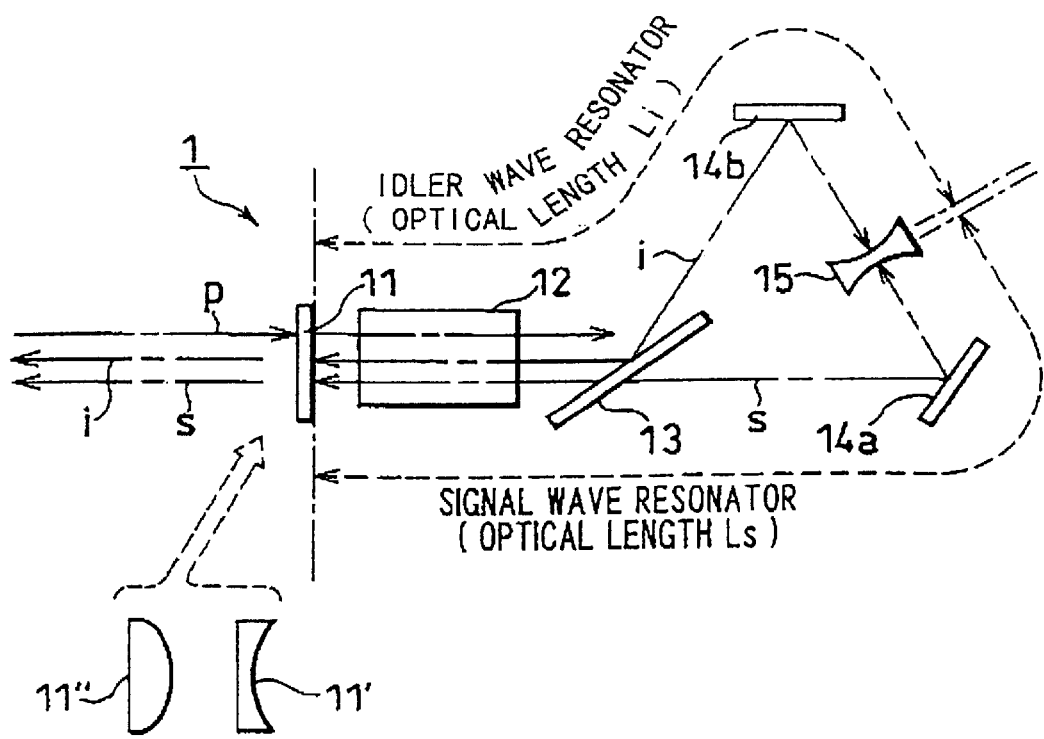
FIG. 1 is a schematic diagram showing an optical parametric oscillator that is a first embodiment of the invention.

Embodiments of the invention optical parametric oscillator will now be explained with reference to the attached drawings.

The operating principle of the invention will be explained first. In order to achieve continuous frequency tuning in a DRO, the resonator optical lengths of the signal wave and the idler wave must be varied under a relationship that maintains oscillation. If a common mirror is used as the end mirror of both the signal and idler optical resonators, the resonator optical lengths can be complementarily (differentially) operated, and the resonator optical length of the signal wave and the resonator optical length of the idler wave can be simultaneously varied by changing the position of the common mirror. Moreover, an effect substantially equivalent to that of using a common end mirror can be realized by separately providing an end mirror for the signal wave and an end mirror for the idler wave and simultaneously moving the two end mirrors in the opposite directions by the same amount.

When the end mirrors of the signal and idler optical resonators are constituted as a common mirror (or equivalent means) in the foregoing manner, moving the common mirror so as to lengthen the resonator optical length of the signal wave shortens the resonator optical length of the idler wave. As a result, the resonant frequency of the signal wave decreases and the resonant frequency of the idler wave increase. On the other hand, moving the common mirror so as to shorten the resonator optical length of the signal wave lengthens resonator optical length of the idler, wave. As a result the resonant frequency of the signal wave increases and the resonant frequency of the idler wave decreases.

Thus when the signal and idler optical resonators share a common end mirror, movement of the common mirror causes one resonator optical length to increase and the other resonator optical length to decrease. In order to realize frequency tuning by complimentarily varying the resonator optical lengths of the signal wave and idler wave in this manner, it is necessary to establish the relationships of the following Equation 2 and Equation 3 among the resonator optical length $L_s$ and oscillation signal wave angular frequency $\omega_s$ in the signal optical resonator, the resonator optical length $L_i$ and idler wave angular frequency $\omega_i$ in the idler optical resonator, and the input pump beam angular frequency $\omega_p$, $$L_s/(L_s+L_i)=\omega_s/\omega_p \qquad \text{Eq. 2}$$

$$L_i/(L_s+L_i)=\omega_i/\omega_p \qquad \text{Eq. 3}$$

Satisfying Equations 2 and 3 is equivalent to the ratios of optical lengths and angular frequencies of the signal optical resonator and idler optical resonator satisfying Equation 4.

$$L_i/L_s=\omega_i/\omega_p \qquad \text{Eq. 4}$$

In other words, if the optical lengths and angular frequencies of the idler optical resonator and the signal optical resonator are set to satisfy Equation 4, Equation 1 will be satisfied and optical parametric oscillation maintained while the common mirror is being moved to conduct continuous frequency tuning.

When a type-II nonlinear crystal is used, the output signal and idler waves are orthogonally polarized and can therefore be split using a polarizing beam splitter or the like. When a type I nonlinear crystal is used, the signal and idler waves can be split using a prism or the like. After the signal wave and idler wave have been split, they are sent to the common end mirror through relay mirrors or the like. The resonator optical length in each optical resonator can then be variably set as desired.

When the resonator optical lengths and angular frequencies of the signal optical resonator and the idler optical resonator have been set to satisfy Equation 4 (or Equations 2 and 3) in the foregoing manner, for the frequency tuning satisfying Equation 1, the maximum variation range $\delta L(Max)$ of the common end mirror displacement $\delta L$ is as shown in Equation 5. In Equation 5, C is the velocity of light and $\gamma$ is an optical resonator loss parameter. When optical resonator internal loss can be ignored and the transmittance of the output mirror is defined as $\tau$, the approximation $\gamma=T/2$ holds.

$$\delta L(\text{Max}) = 2C\gamma/[\omega_s - \omega_p \times L_s/(L_s + L_i)] \quad \text{Eq. 5}$$

In other words oscillation can be sustained so long as the common mirror shared by the two resonators is moved within the range of δL(Max) because within this range the signal wave and idler wave oscillations remain within the resonance ranges of their respective optical resonators. Moreover, insofar as Equation 4 (or Equations 2 and 3) is sufficiently satisfied, the denominator of the night side of Equation 5 is zero or a negligibly small value. Since δL(Max) can therefore be made extremely large, a large frequency (wavelength) tuning range can be obtained.

FIG. 1 shows an optical parametric oscillator 1 that is the first embodiment of this invention. A pump beam p is input to a type-II nonlinear crystal 12 through an input/output mirror 11 that serves as both an input mirror for the pump beam p and an output mirror for a signal wave s and an idler wave i. The signal wave and idler wave exiting the nonlinear crystal 12 are split by a polarizing beam splitter 13 and advance via respective relay mirrors 14a, 14b to a common end mirror 15 (the signal wave s is p-polarized and the idler wave i is s-polarized).

Thus the input/output mirror 11, nonlinear crystal 12, polarizing beam splitter 13, relay mirror 14a and common end mirror 13 constitute signal optical resonance means, while the input/output mirror 11, nonlinear crystal 12, polarizing beam splitter 13, relay mirror 14b and common end mirror 15 constitute idler optical resonance means. As a result, a signal optical resonator of resonator optical length $L_s$ and an idler optical resonator of resonator optical length $L_i$ can be configured in the optical parametric oscillator 1.

Figure 15A:
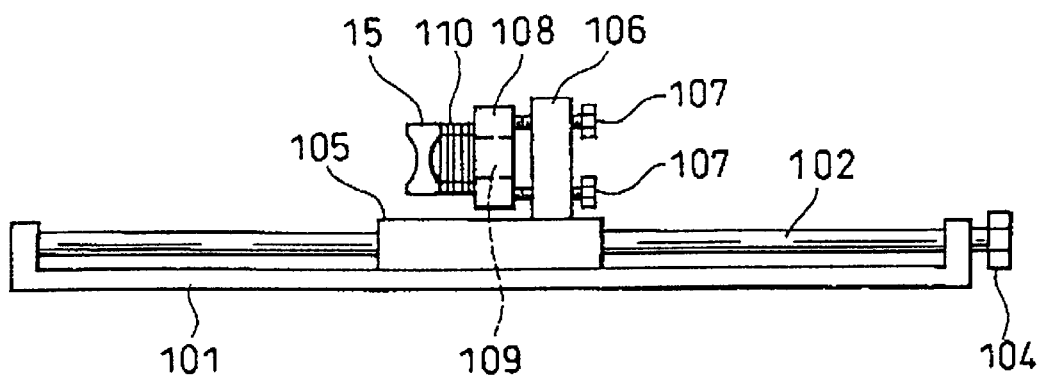
FIG. 15($a$) is a schematic diagram showing the side of one example of a drive system for moving the common end mirror.
Figure 15B:
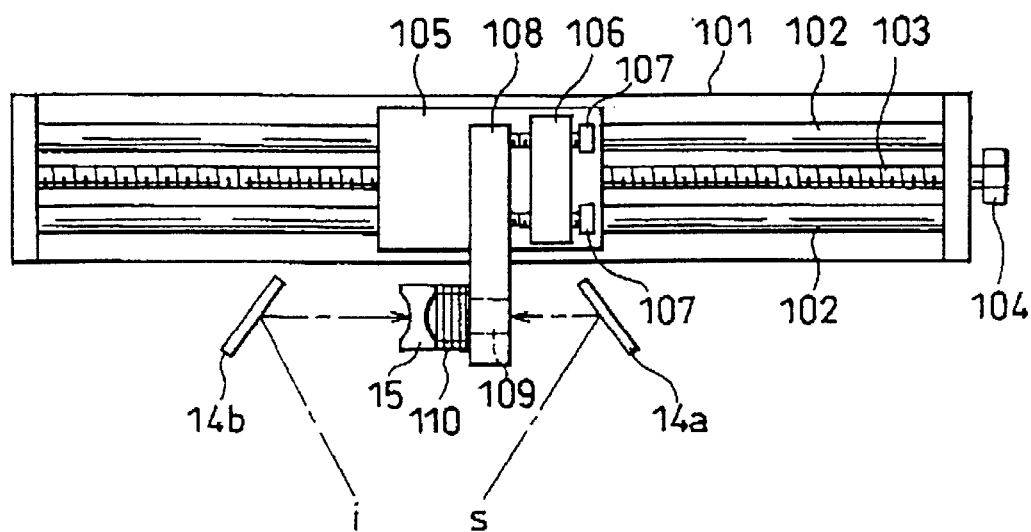

The opposite sides of the common end mirror 15 are formed as concave mirrors applied with mirror coatings. As explained earlier, a continuous frequency (wavelength) tuning characteristic is obtained when the common end mirror 15 is moved within the interval between the relay mirrors 14a, 14b. It is extremely difficult for a human operator to move the common end mirror 15 without changing the incident angles of the signal wave and idler wave. A system for moving the common end mirror 15 along a slide guide or the like is therefore preferably installed. Otherwise the operation of moving the common end mirror 15 can be carried out using an appropriate drive system. One example of the drive system is shown in FIG. 15. It comprises a stage 101, a guide rail 102, a screw rod 103, a handle 104, a slide stage 105 and a support member 106. The slide stage 105 is provided on the stage 101 so that it can be guided by the guide rail 102 and slide with the rotation of the screw rod 103. The support member 106 is provided on the slide stage 105 so that it can support an arm member 108 by means of two screws 107. The arm member 108 has at the leading end thereof a hole 109 for supporting the common end mirror 15 via a piezoelectric element 110 provided with an aperture.

The signal wave s reflected by the relay mirror 14a transmits through the hole 109 of the arm member 108 and the aperture of the piezoelectric, element 110 and led to one side of the common end mirror 15. The idler wave i reflected by the relay mirror 14b is led to the opposite side of the common end mirror 15.

In changing the optical length of each resonator, coarse adjustment is made by rotating the handle 104 to move the slide stage 105 and fine adjustment by applying an electrical signal to the piezoelectric element 110.

The drive system can be precisely controlled by a controller configured using a computer or the like.

The optical parametric oscillator 1 is not limited to use of the illustrated flat input/output mirror 11. A concave input/output mirror 11' or a convex input/output mirror 11" can be used as well.

Figure 2:
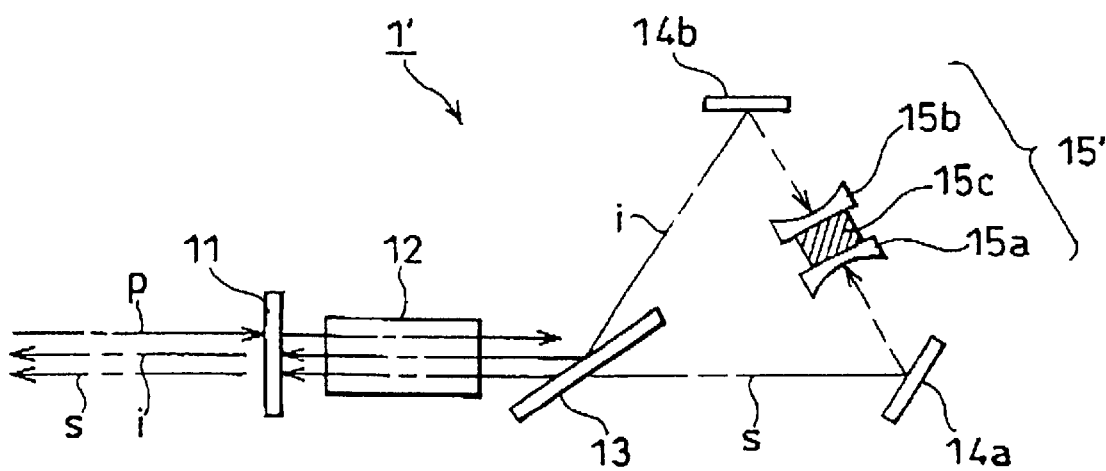
FIG. 2 is a schematic diagram showing a common end mirror of the first embodiment replaced with an equivalent unit.

The optical parametric oscillator 1' shown in FIG. 2 achieves the same effect as obtained with the common end mirror 15 by using a common end mirror equivalent unit 15' composed of a signal wave end mirror 15a and an idler wave end mirror 15b fixed together by an intervening adhesive member 15c. The adhesive member 15c is preferably made of a material that does not experience heat expansion or contraction.

Figure 3:
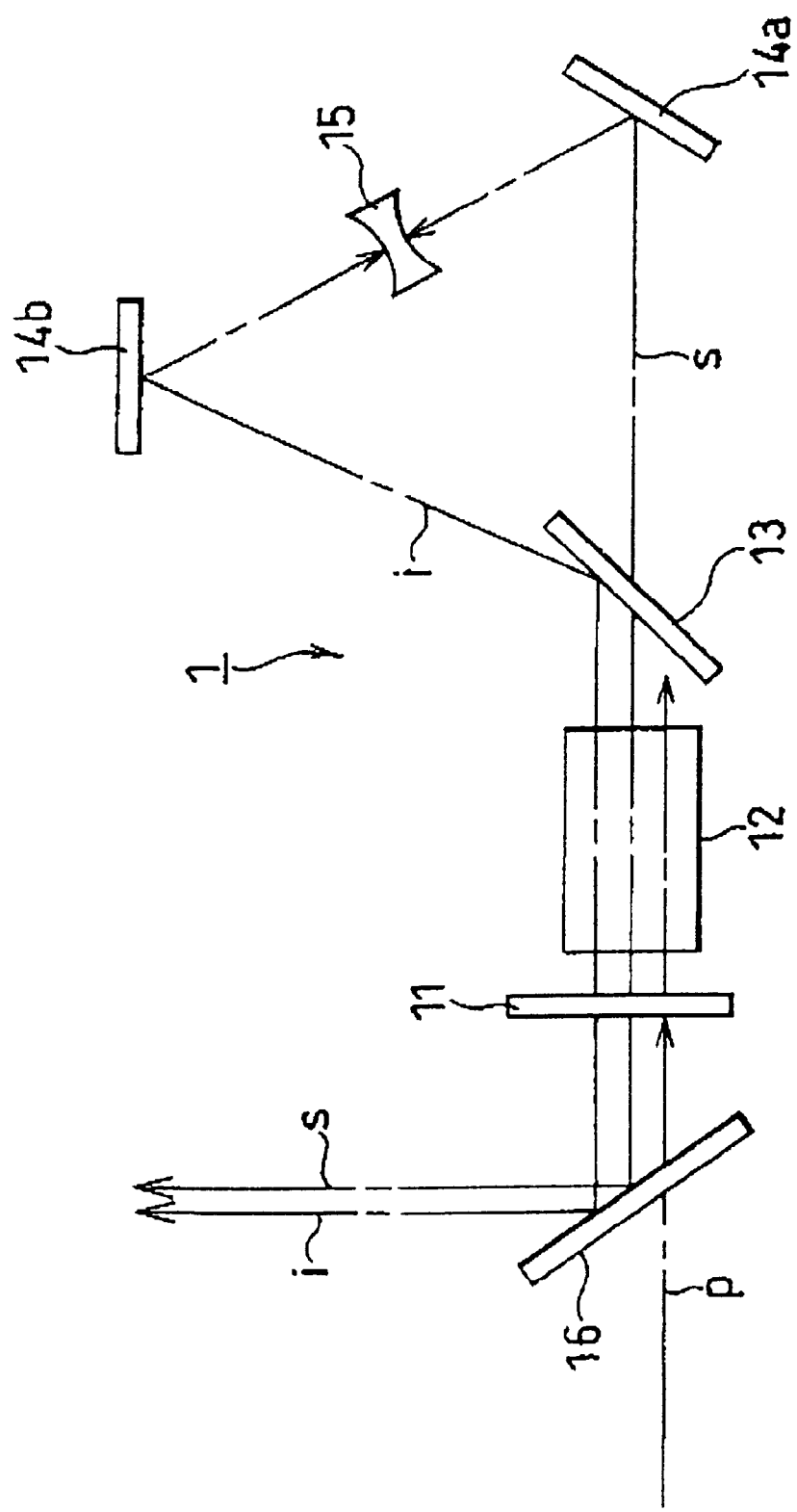
FIG. 3 is a schematic diagram showing a first example of an input beam and output beam splitting method in the first embodiment.

The optical parametric oscillators 1, 1' can utilize conventional means to split the input beam (pump beam) p and the output beams (signal wave and idler wave) s, i. For instance, a dichroic mirror 16 that exhibits reflectance or transmission depending on wavelength can be used as shown in FIG. 3. In this case, the input beam (pump beam) transmits through the dichroic mirror 16 and reaches the input/output mirror 11. The output beam (signal wave and idler wave) from the input/output mirror 11 is reflected by the dichroic mirror 16. The signal wave s and idler wave i can therefore be separated from the pump beam p.

Figure 4:
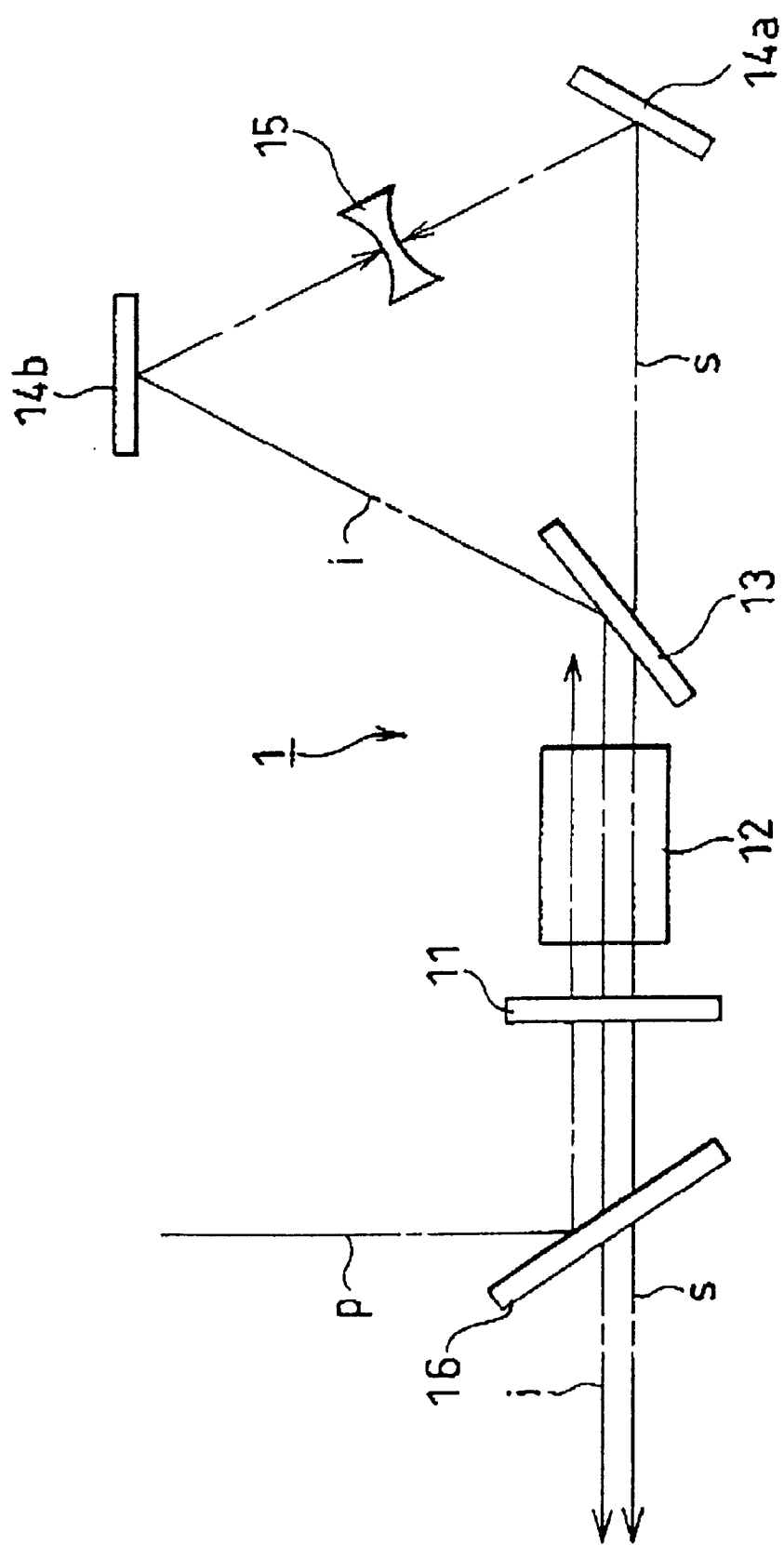
FIG. 4 is a schematic diagram showing a second example of an input beam and output beam splitting method in the first embodiment.

As shown in FIG. 4, the signal wave and idler wave can also be separated from the pump beam by reflecting the input beam (pump beam) from the dichroic mirror 16 onto the input/output mirror 11 and transmitting the output beam (signal wave and idler wave) through the dichroic mirror 16.

Figure 5:
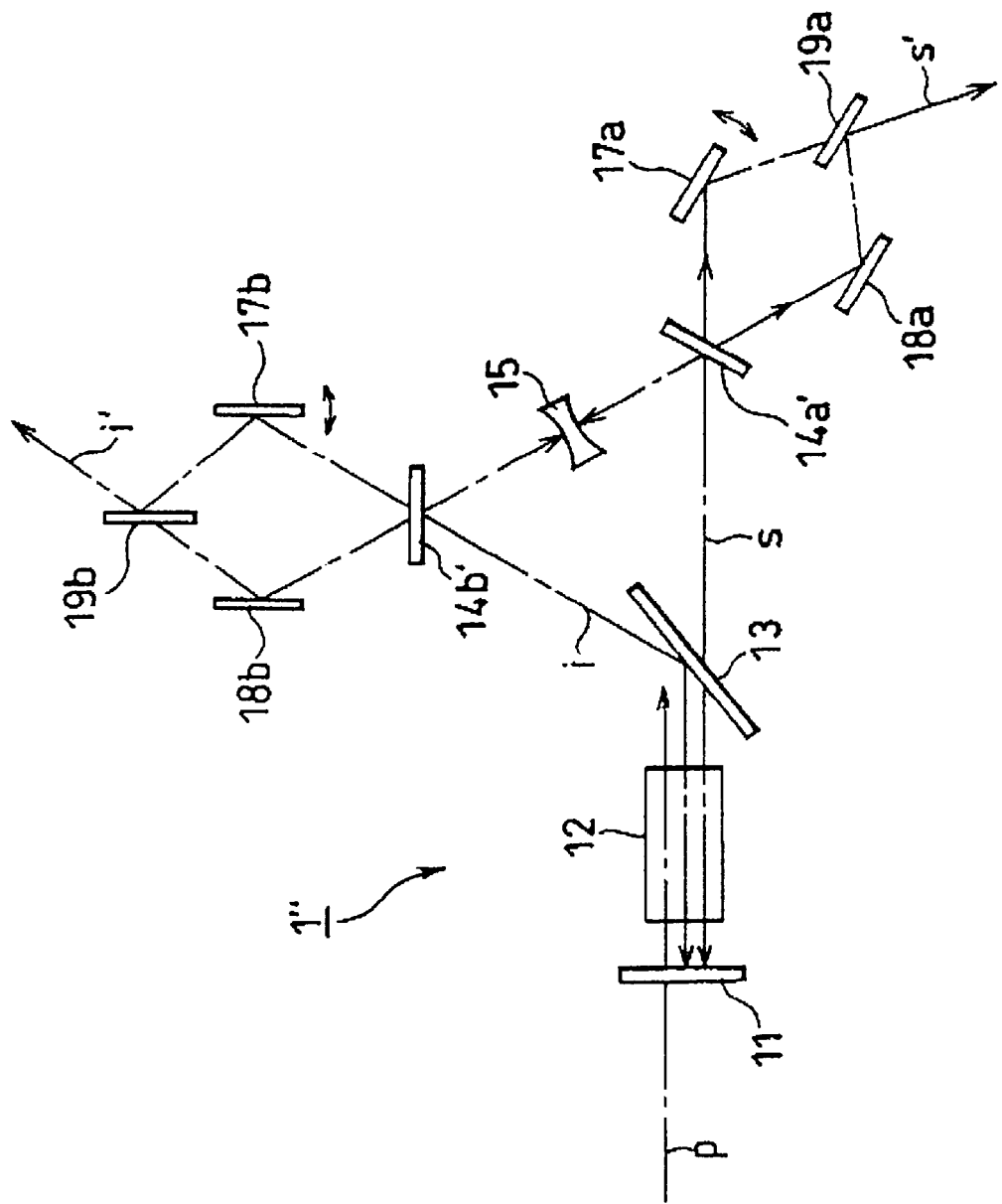
FIG. 5 is a schematic diagram showing a third example of an input beam and output beam splitting method in the first embodiment.

The optical parametric oscillator 1" shown in FIG. 5 uses mirrors of, for example, 90–99% transmittance as a first relay/output mirror 14a' and a second relay/output mirror 14b'. The signal wave s from the polarizing beam splitter 13 transmits through the first relay/output mirror 14a' and is reflected by a first guide mirror 17a to a synthesizing half mirror 19a. The signal wave from the common end mirror 15 transmits through the first relay/output mirror 14a' and is reflected by a second guide mirror 18a to the synthesizing half mirror 19a. The signal wave reaching the synthesizing half mirror 19a from the first guide mirror 17a and the signal wave from the second guide mirror 18a reflected by the synthesizing half mirror 19a combine to produce a composite signal wave s'. The idler wave i from the polarizing beam splitter 13 transmits through the second relay/output mirror 14b' and is reflected by a first guide mirror 17b to a synthesizing half mirror 19b. The idler wave from the first guide mirror 17b reflected by the synthesizing half mirror 19b and the idler wave reaching the synthesizing half mirror 19b from the second guide mirror 18b combine to produce a composite idler wave i'.

The operating principle utilized by synthesizing half mirrors 19a, 19b for light synthesis is the interference action of light waves. When the phases of the transmitted wave and the reflected wave arc superimposed at either side of the respective mirrors of the synthesizing half mirrors 19a, 19b, the phases of the transmitted wave and reflected wave are offset by 180 degrees at the other side. The waves therefore cancel each other to produce zero output. This effect is used to extract the signal wave from one side of the synthesizing half mirror 19a and the idler wave from one side of the synthesizing half mirror 19b.

At this time, fine adjustment is needed to bring the phases of the signal wave from the first guide mirror 17a and the signal wave from the second guide mirror 18a into coincidence and to bring the phases of the idler wave from the first guide mirror 17b and the idler wave from the second guide mirror 18b into coincidence. In the example of FIG. 5, the first guide mirrors 17a, 17b are moved without changing their reflection angle. The movement of the first guide mirror 17a or 17b is on the order of the wavelength of the signal wave or idler wave, and the diameter of the beam connecting each guide mirror and the associated synthesizing half mirror 19a or 19b is considerably large relative to movement of the guide mirror. The amount by which the beam synthesis point on the synthesizing half mirror 19a or 19b is shifted owing to movement of the first guide mirror 17a or 17b is therefore negligibly small.

Figure 6:
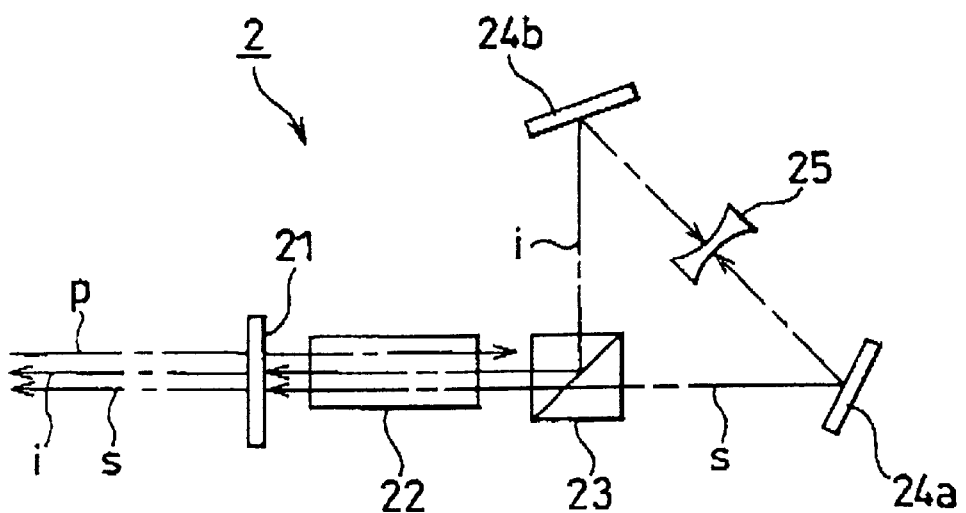
FIG. 6 is a schematic diagram showing an optical parametric oscillator that is a second embodiment of the invention.

FIG. 6 shows an optical parametric oscillator 2 that is a second embodiment of this invention. A pump beam p is input to a type-II nonlinear crystal 22 through an input/output mirror 21 that doubles as an input mirror for the pump beam p and an output mirror for the signal wave s and the idler wave i. The signal wave s and idler wave i exiting the nonlinear crystal 22 are split by a polarizing cubic beam splitter 23 and advance via respective relay mirrors 24a, 24b to a common end mirror 25. The methods of separating the input and output waves and the replacement of the common end mirror with an equivalent unit comprising two end mirrors of the first embodiment can be applied to the second embodiment without modification.

Figure 7:
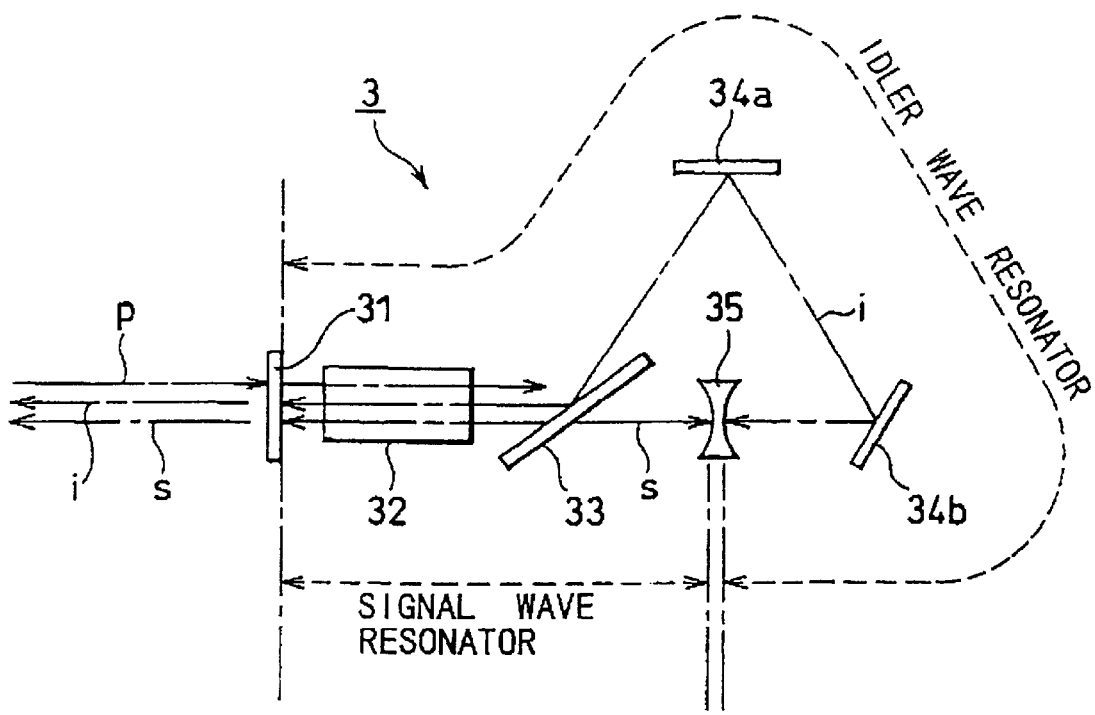
FIG. 7 is a schematic diagram showing an optical parametric oscillator that is a third embodiment of the invention.

FIG. 7 shows an optical parametric oscillator 3 that is a third embodiment of this invention. A pump beam p is input to a type-II nonlinear crystal 32 through an input/output mirror 31 that doubles as an input mirror for the pump beam p and an output mirror for the signal wave s and the idler wave i. The signal wave s and idler wave i exiting the nonlinear crystal 32 are split by a polarizing beam splitter 33. The signal wave transmitting through the polarizing beam splitter 33 advances directly to a common end mirror 35 and the idler wave reflected by the polarizing beam splitter 33 advances to the common end mirror 35 via relay mirrors 34a, 34b.

Figure 8:
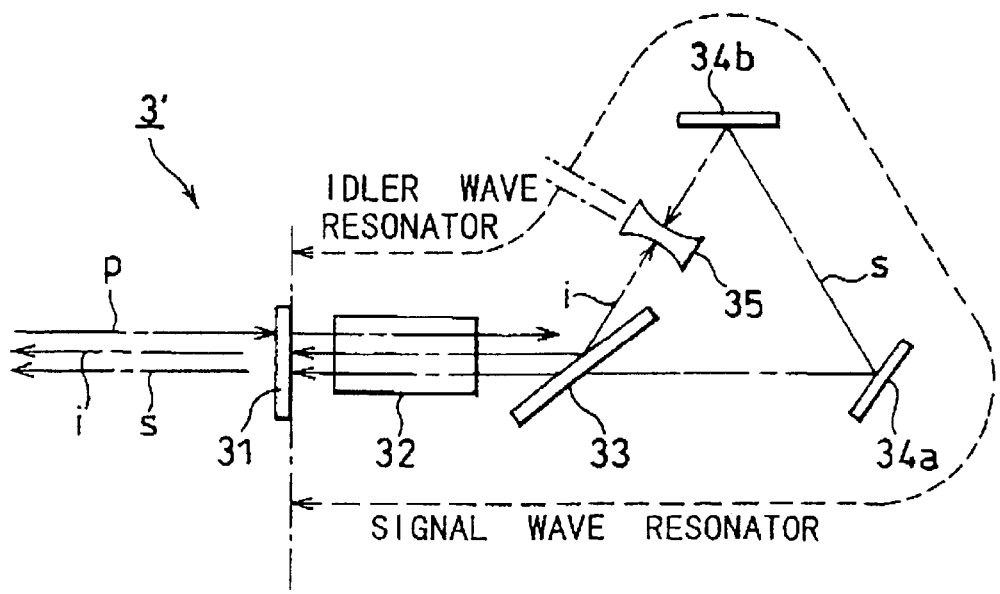
FIG. 8 is a schematic diagram showing the common end mirror of the third embodiment changed in position.

FIG. 8 shows an optical parametric oscillator 3' that is a variation of the third embodiment. The pump beam p is input to the type-II nonlinear crystal 32 through the input/output mirror 31 that doubles as an input mirror for the pump beam p and an output mirror for the signal wave s and the idler wave i. The signal wave s and idler wave i exiting the nonlinear crystal 32 are split by the polarizing beam splitter 33. The signal wave transmitting through the polarizing beam splitter 33 advances to the common end mirror 35 via the relay mirrors 34a, 34b and the idler wave reflected by the polarizing beam splitter 33 advances directly to the common end mirror 35.

Thus it is only required that the signal resonator optical length $L_s$, idler resonator optical length $L_i$, signal wave angular frequency $\omega_s$ and idler wave angular frequency $\omega_i$ be determined so as to satisfy Equation 4 (or Equations 2 and 3), and the paths over which the resonator optical lengths of the resonators are established is not particularly limited.

Figure 9:
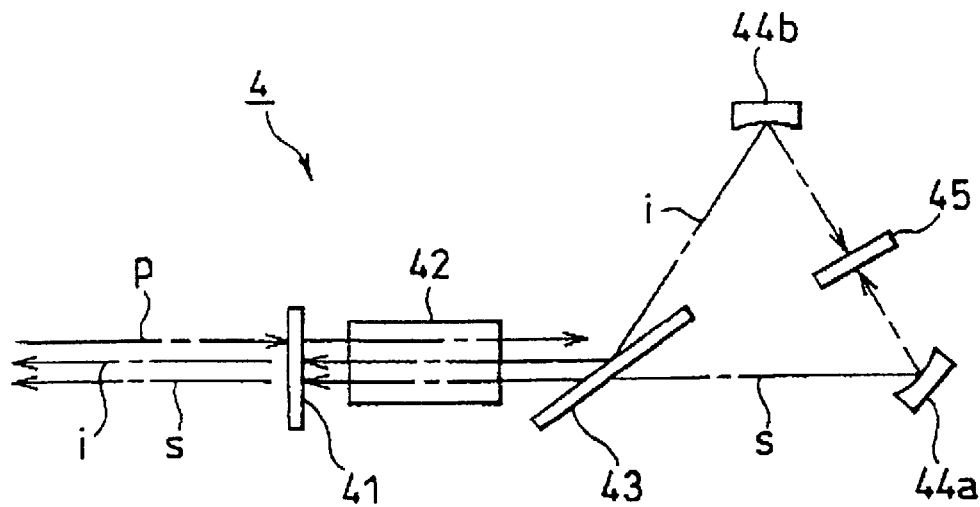
FIG. 9 is a schematic diagram showing an optical parametric oscillator that is a fourth embodiment of the invention.

FIG. 9 shows an optical parametric oscillator 4 that is a fourth embodiment of this invention. A pump beam p is input to a type-II nonlinear crystal 42 through an input/output mirror 41 that doubles as an input mirror for the pump beam p and an output mirror for the signal wave s and the idler wave i. The signal wave s and idler wave i exiting the nonlinear crystal 42 are split by a polarizing beam splitter 43 and advance via respective concave relay mirrors 44a, 44b to a common end mirror 45.

Figure 10:
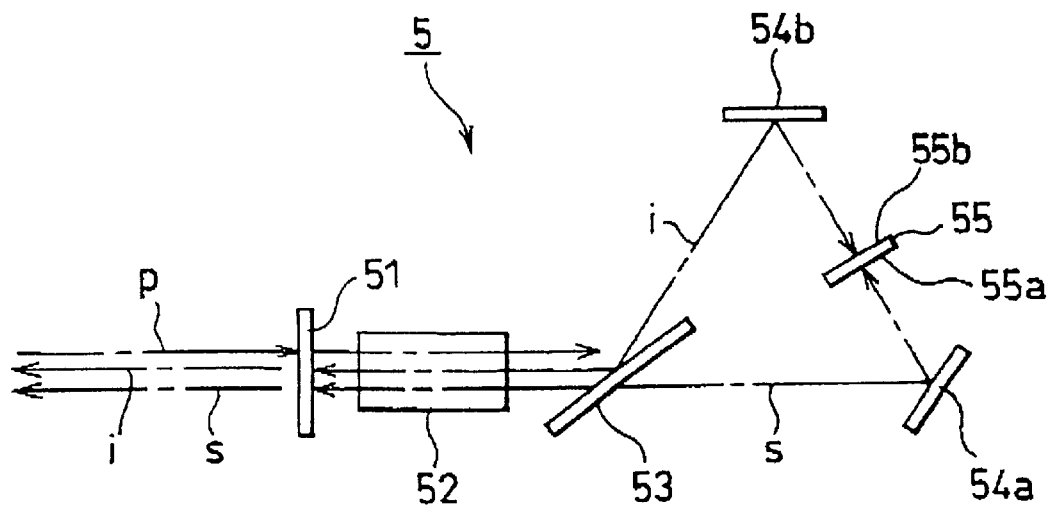
FIG. 10 is a schematic diagram showing an optical parametric oscillator that is a fifth embodiment of the invention.

FIG. 10 shows an optical parametric oscillator 5 that is a fifth embodiment of this invention. A pump beam p is input to a type-II nonlinear crystal 52 through an input/output mirror 51 that doubles as in input mirror for the pump beam p and an output mirror for the signal wave s and the idler wave i. The signal wave s and idler wave i exiting the nonlinear crystal 52 are split by a polarizing beam splitter 53 and advance via respective flat relay mirrors 54a, 54b to a common end mirror 55. The optical parametric oscillator 5 can be applied when a large parametric gain is obtained by use of a pulse laser or the like as the pumping light source or, in the future, when improvement of nonlinear material properties makes it possible to obtain high gain.

Figure 11:
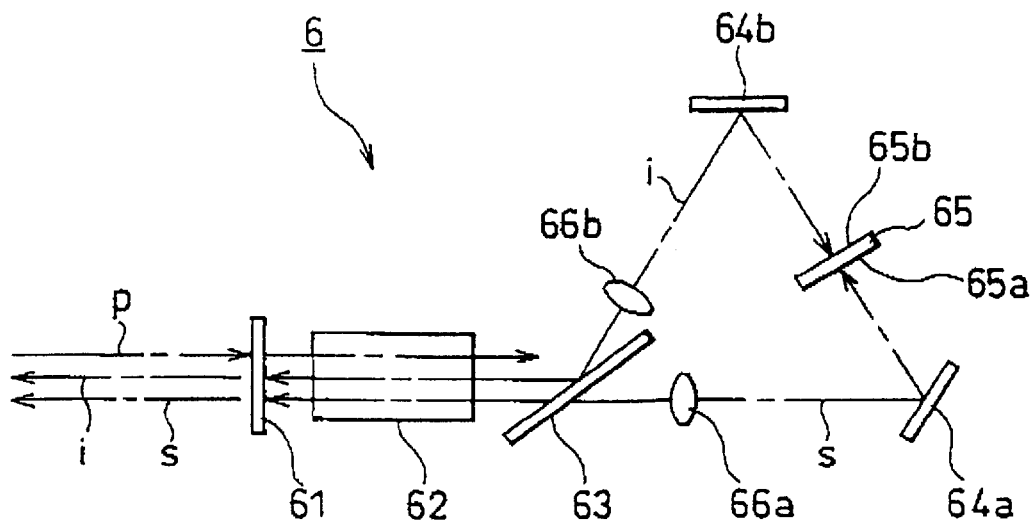
FIG. 11 is a schematic diagram showing an optical parametric oscillator that is a sixth embodiment the invention.

FIG. 11 is a schematic diagram showing an optical parametric oscillator 6 that is a sixth embodiment of the invention, which will be used to explain how an optical parametric oscillator using flat mirrors as the relay mirrors and common end mirror as described in the foregoing can achieve stable oscillation using a continuous wave (CW) as the pumping light source.

In the optical parametric oscillator 6, a pump beam p is input to a type-II nonlinear crystal 62 through an input/output mirror 61 that doubles as an input mirror for the pump beam p and an output mirror for the signal wave s and the idler wave i. The signal wave s and idler wave i exiting the nonlinear crystal 62 are split by a polarizing beam splitter 63 and advance via respective flat relay mirrors 64a, 64b to a flat common end mirror 65. A lens 66a is disposed between the polarizing beam splitter 63 and the relay mirror 64a and a lens 66b is disposed between the polarizing beam splitter 63 and the relay mirror 64b. The insertion of the lenses 66a and 66b in this manner enables stable oscillation with a CW. The location of the lenses 66a, 66b is not limited to that in this embodiment but can be appropriately selected with consideration to the design of the optical resonators.

When a flat mirror is used as the common end mirror of the optical parametric oscillator as in the fifth and sixth embodiments, it suffices, for example to provide the common end mirror 55, 65 with a mirror coating on only a first side 55a, 65a at the side of the signal optical resonator and to provide an anti-reflection (AR) coating on the other (second) bide 55b, 65b at the side of the idler optical resonator. The so-structured optical parametric oscillator enjoys stabler oscillation because it is less affected by thermal expansion and other factors attributable to the thickness of the mirror material used in the common end mirror 55, 65. The same effect can be obtained by providing the common end mirror 55, 65 with a mirror coating on the second side 55b, 65b at the side of the idler optical resonator and with an AR coating on the first side 55a, 65a at the side of the signal optical resonator. A common end mirror equivalent unit composed of a signal wave end mirror 15a and an idler wave end mirror 15b fixed together by an intervening adhesive member 15c can be used instead of the common end mirror 55, 65.

Figure 12:
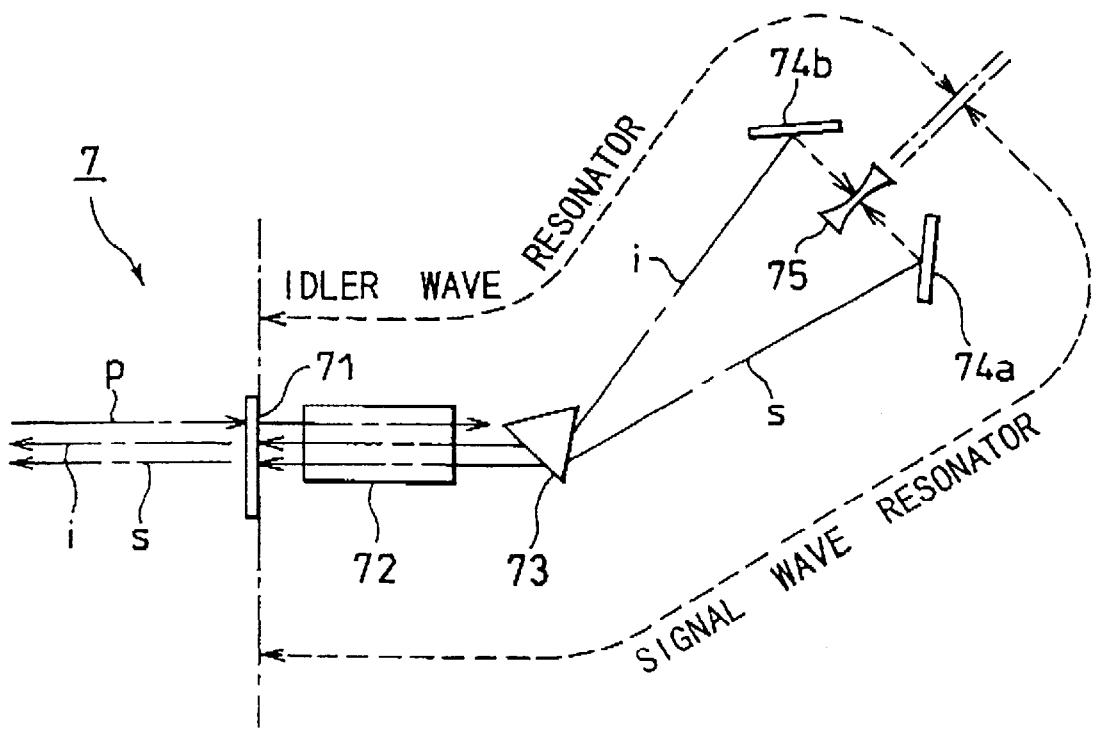
FIG. 12 is a schematic diagram showing an optical parametric oscillator that is a seventh embodiment of the invention.

FIG. 12 is a schematic diagram showing an optical parametric oscillator 7 that is a seventh embodiment of the invention. A pump beam p is input to s type-I nonlinear crystal 72 through an input/output mirror 71 that doubles as an input mirror for the pump beam p and an output mirror for the signal wave s and the idler wave i. The signal wave s and idler wave light exiting the nonlinear crystal 72 are split by a prism 73 and advance via respective relay mirrors 74a, 74b to a common end mirror 75. A signal optical resonator and an idler optical resonator like those of the earlier embodiments can also be configured using a type-I nonlinear crystal. The splitting of the input and output waves can be effected not only by use of a dichroic mirror as explained earlier but also by use of a polarizing beam splitter.

Figure 13:
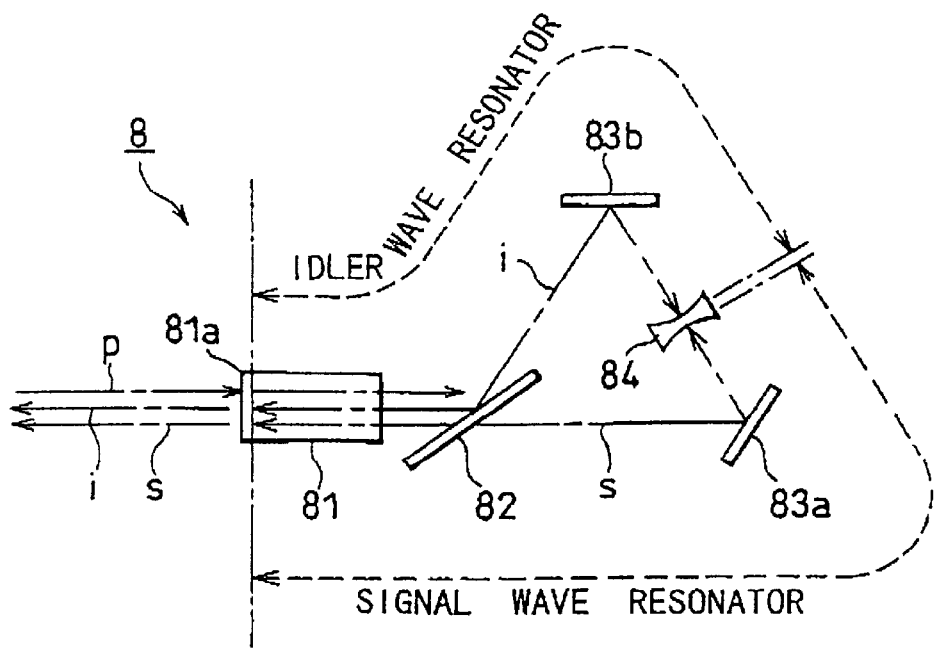
FIG. 13 is a schematic diagram showing an optical parametric oscillator that is an eighth embodiment of the invention.

FIG. 13 is a schematic diagram showing an optical parametric oscillator 8 that is an eighth embodiment of the invention. The optical parametric oscillator 8 does away with the input/output mirror that in the earlier embodiments doubles as an input mirror for the pump beam p, and an output mirror for the signal wave s and the idler wave i and instead uses a type-II nonlinear crystal 81 whose crystal end face 81a on the input side of the pump beam p is provided with a reflection coating. The signal wave s and idler wave i exiting the nonlinear crystal 81 are split by a polarizing beam splitter 82 and advance via respective relay mirrors 83a, 83b to a common end mirror 84. The same effect can also be obtained using a type-I nonlinear crystal whose crystal end face on the input side of the pump beam p is provided with a reflection coating.

Figure 14:
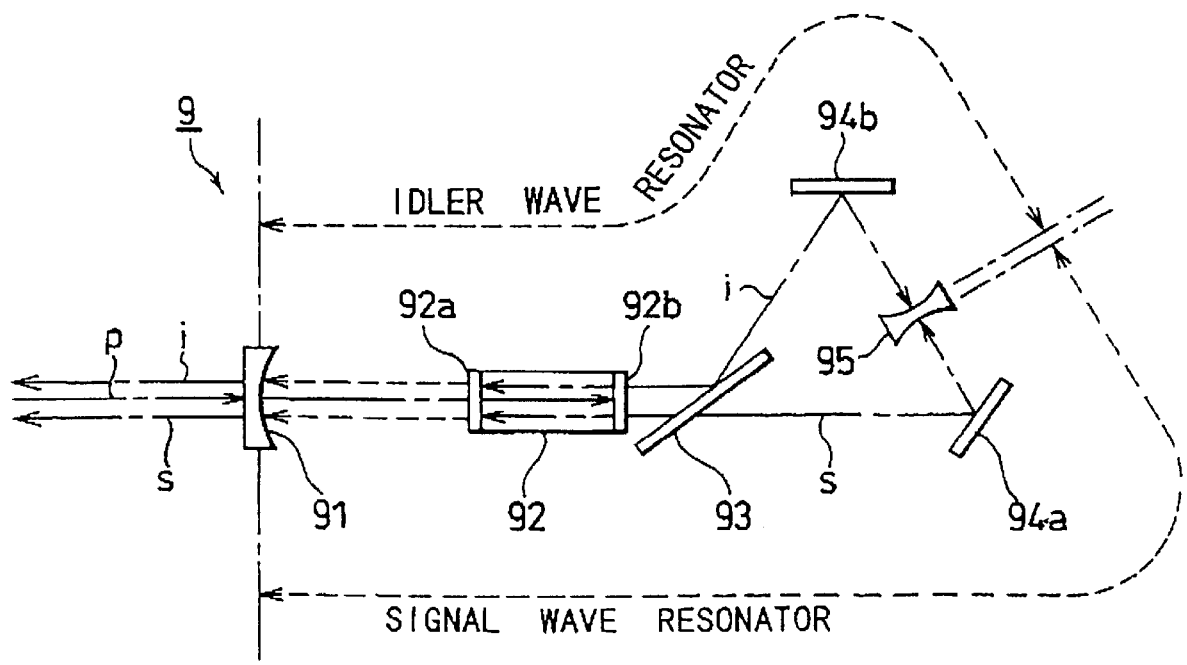
FIG. 14 is a schematic diagram showing an optical parametric oscillator that is a ninth embodiment of the invention.

FIG. 14 is a schematic diagram showing an optical parametric oscillator that is a ninth embodiment of the invention. A pump beam p is input to a type-II nonlinear crystal 92 through an input/output mirror 91 that doubles as an input mirror for the pump beam p and an output mirror for the signal wave s and the idler wave i. The signal wave s and idler wave i exiting the nonlinear crystal 92 are split by polarizing beam splitter 93 and advance via respective relay mirrors 94a, 94b to a common end mirror 95. The nonlinear crystal 92 is provided on its crystal end face 92a at the pump beam p input side with a reflection coating for the signal wave s and idler wave i and on its opposite crystal end face 92b with a reflection mirror coating for the pump beam p, thus configuring a triply resonant optical parametric oscillator (TRO) that also simultaneously resonates the pump beam p. By increasing the intensity of the pump beam in the nonlinear crystal, this configuration can reduce the oscillation threshold to a very low level. The same effect also be obtained using a type-I nonlinear crystal whose crystal end face on the pump beam p input side is provided with a reflection coating for the signal wave s and idler wave i and whose opposite crystal end face is provided with a reflection mirror coating for the pump beam p.

As explained in the foregoing the optical parametric oscillator according to this invention utilizes a beam splitter to obtain a signal wave of angular frequency $\omega_s$ and an idler wave of angular frequency $\omega_i$, resonates the signal wave at a resonator optical length $L_s$ using a signal optical resonator, resonates the idler wave at a resonator optical length $L_i$ using an idler optical resonator, and, under conditions set such that the resonator optical length $L_s$ of the signal optical resonator and the resonator optical length $I_i$ of the idler optical resonator satisfy the relationship $L_i/L_s = \omega_i/\omega_s$, moves a common end mirror within a range wherein the maximum variation range $\delta L(Max)$ satisfies $\delta L(Max) = 2C\gamma/[\omega_s - \omega_p \times L_s/(L_s + L_i)]$,s thereby enabling continuous frequency tuning while maintaining the signal wave and idler wave oscillations. The optical parametric oscillator according to the invention therefore achieves continuous frequency (wavelength) tuning in a doubly resonant optical parametric oscillator (DRO), which resonates both the signal wave and the idler wave.

This invention therefore eliminates the need to rely on the singly resonant optical parametric oscillator (SRO), which s achieve continuous frequency (wavelength) tuning but has a high threshold. Specifically, it provides a continuously frequency-tunable DRO with a low oscillation threshold that can be used as a pump light source for a low-output commercial laser or the like and can achieve stable oscillation at high efficiency.

Moreover, the optical parametric oscillator according to this invention separates the signal wave and the idler wave by use of beam splitting means and provides separate signal and idler optical resonance means. Therefore, unlike the conventional optical parametric oscillator having a single optical resonator for the signal wave and the idler wave, it does not experience oscillation instability owing to the mode hopping that arises when very slight resonator shifts produced by vibration of the resonator mirrors or the like cause a change in the combination of resonance modes satisfying the oscillation conditions.

In addition, the invention DRO uses a common end mirror for the end mirror of the signal optical resonator means and the end mirror of the idler optical resonator means. It therefore does not require any complex movement control for changing resonator lengths because the end mirror of the signal optical resonator means and the end mirror, of the idler optical resonator means can be simultaneously moved in, the opposite directions on the same are by the same amount simply by moving the common end mirror. What is more, the fact that the signal and idler optical resonator means share a common end mirror ensures that the oscillation conditions can be maintained even if the resonator lengths should dither slightly owing to vibration of the common end mirror. The invention optical parametric oscillator can therefore achieve stable oscillation.

What is claimed is:

1. An optical parametric oscillator comprising:
   a nonlinear element for converting an incident pump beam of angular frequency $\omega_p$ into a combination of a signal wave of angular frequency $\omega_s$ and an idler wave of angular frequency $\omega_i$ at an arbitrary angular frequency ratio,
   beam splitting means for splitting the combination exiting the nonlinear element into the signal wave of angular frequency $\omega_s$ and the idler wave of angular frequency $\omega_i$,
   signal optical resonance means for resonating the signal wave split by the beam splitting means at a resonator optical length $L_s$ between an input mirror and a first end mirror, and
   idler optical resonance means for resonating the idler wave split by the beam splitting means at a resonator optical length $L_i$ between an input mirror and a second end mirror,
   the resonator optical length $L_s$ of the signal optical resonance means and the resonator optical length $L_i$ of the idler optical resonance means being set to satisfy the relationship $L_i/L_s = \omega_i/\omega_s$,
   a signal wave reflection side functioning as the first end mirror, of the signal optical resonance means and an idler wave reflection side functioning as the second end mirror of the idler optical resonance means being faced in opposite directions to form a common end minor, and
   continuous frequency tuning being conducted while maintaining signal wave and idler wave oscillations by moving the common end mirror within a range wherein a maximum variation range $\delta L(Max)$ satisfies $\delta L(Max) = 2C\gamma/[\omega_s - \omega_p \times L_s/(L_s + L_i)]$ (where C is the velocity of light and $\gamma$ is an optical resonator loss parameter).

2. An optical parametric oscillator according to claim 1, wherein the nonlinear element is a nonlinear crystal the beam splitting means is a polarizing beam splitter, the signal optical resonance means comprises an input/output mirror, the nonlinear crystal, the polarizing beam splitter, a first relay mirror and the first end mirror, and the idler optical resonance means comprises the input/output mirror, the nonlinear crystal, the polarizing beam splitter, a second relay mirror and the second end mirror provided on an opposite side from the reflection of the first end mirror.

3. An optical parametric oscillator according to claim 1, wherein the nonlinear element is a nonlinear crystal the beam splitting means is a prism, the signal optical resonance means comprises an input/output mirror the nonlinear crystal, the prism a first relay mirror and the first end mirror, and the idler optical resonance means comprises the input/output mirror, the nonlinear crystal, the prism, a second relay mirror and the second end mirror provided on an opposite side from the reflection of the first end mirror.

* * * * *